US006886192B1

(12) United States Patent
Merrill

(10) Patent No.: US 6,886,192 B1
(45) Date of Patent: May 3, 2005

(54) TOILET LIFTING AND TRANSPORT DEVICE AND METHOD

(76) Inventor: Dennis A. Merrill, 5613 S. Eastern Ave., Las Vegas, NV (US) 89119

( * ) Notice: Subject to any disclaimer, the term of this patent is extended or adjusted under 35 U.S.C. 154(b) by 0 days.

(21) Appl. No.: 10/859,690

(22) Filed: Jun. 3, 2004

(51) Int. Cl.[7] .............................. A47K 4/00; B60P 1/10
(52) U.S. Cl. .......................... 4/661; 254/7 R; 414/460
(58) Field of Search ............................................. 4/661

(56) References Cited

U.S. PATENT DOCUMENTS

| | | | | |
|---|---|---|---|---|
| 4,722,511 A | * | 2/1988 | Chitwood ................... 254/7 R |
| 5,203,065 A | * | 4/1993 | Peters ....................... 29/281.4 |
| 5,373,593 A | * | 12/1994 | Decky et al. ................... 4/661 |
| 5,505,430 A | * | 4/1996 | Barnett ....................... 254/2 R |
| 6,015,137 A | * | 1/2000 | Guevara et al. ............ 254/323 |
| 6,685,170 B1 | * | 2/2004 | Gwynn ....................... 254/325 |
| 6,752,379 B1 | * | 6/2004 | Wall ........................... 254/7 R |

* cited by examiner

Primary Examiner—Charles E. Phillips
(74) Attorney, Agent, or Firm—Rob L. Phillips; Quirk & Tratos

(57) ABSTRACT

A toilet lifting and transport device. The device has forward legs and rear legs, with the forward legs being selectively deployable in an open configuration for lifting and transporting use, and a closed configuration for storage. A screw lift is positioned on at least one horizontal support that is positioned between the rear legs. The lifting device is coupled to a toilet fixture via a tank strap and bridge straps. Lifting of the toilet fixture is then accomplished utilizing the screw lift. Transport of the lifting device with the toilet fixture thereon is accomplished by rolling the lifting device on wheels located on the bottoms of the rear and forward legs.

20 Claims, 2 Drawing Sheets

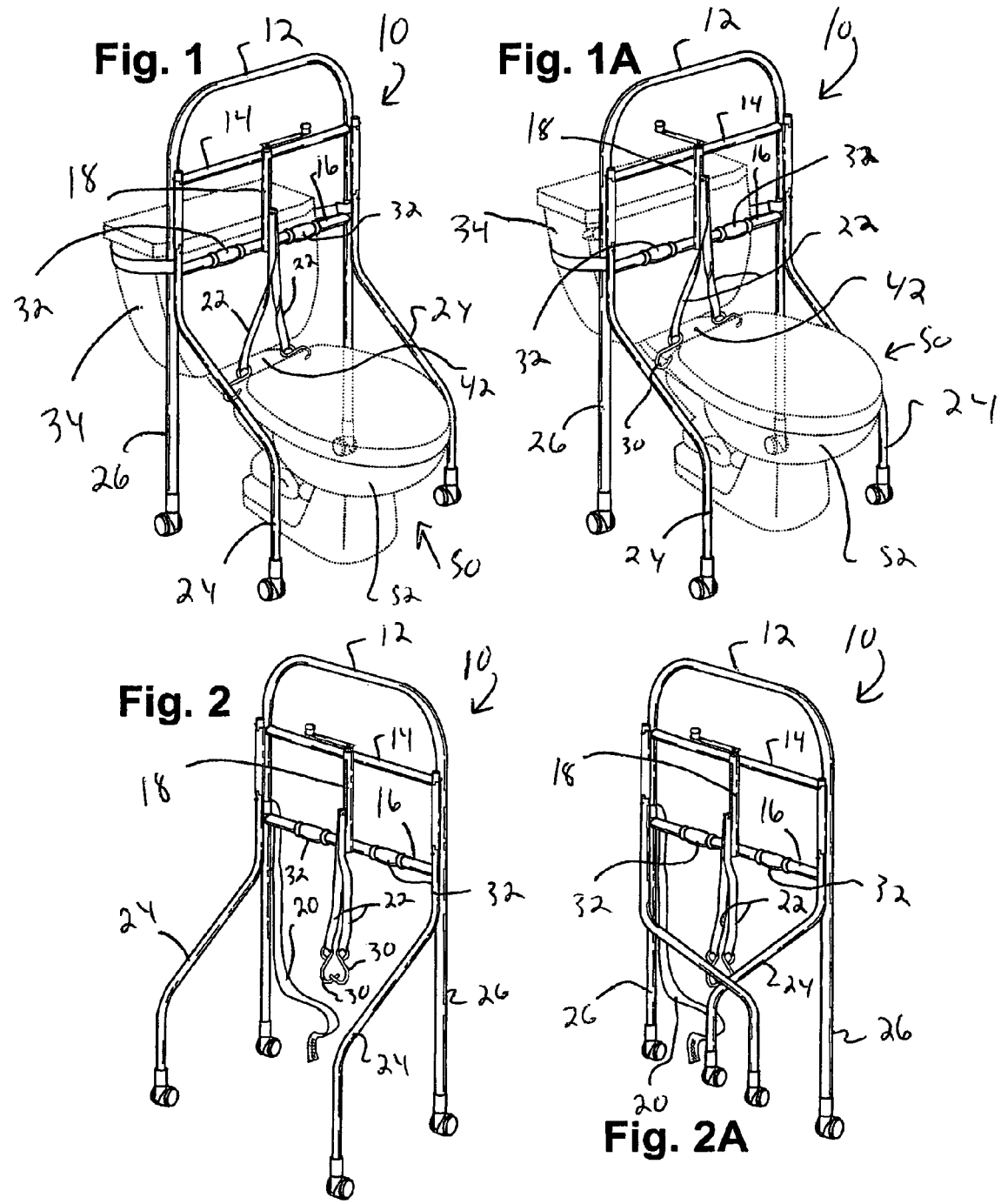

TOILET LIFTING AND TRANSPORT DEVICE AND METHOD

FIELD OF THE INVENTION

This invention relates generally to the field of toilet lifting and transport devices and, more specifically, to a collapsible and relatively simple device for lifting and transporting a toilet.

BACKGROUND OF THE INVENTION

A toilet fixture, consisting essentially of a tank and a bowl, is a relatively heavy and cumbersome object. It can be difficult to lift and move, particularly for an individual working without assistance from a partner.

Over the years, there have been a number of attempts to develop a suitable lifting and transport device for toilets. Examples include the devices shown in U.S. Pat. Nos. 3,262,590 (Lynn); 3,391,905 (Burns); 4,722,511 (Chitwood); 5,203,065 (Peters); 5,373,593 (Decky); 5,556,076 (Jacquay); 6,015,137 (Guevara); and 6,685,170 (Gwynn).

However, prior art devices have tended to be relatively complicated, with a significant number of moving parts. They are typically also bulky, and do not collapse for transport (without a toilet thereon) or storage. (Collapsibility for storage can be particularly important to a person who is conducting repair work on his or her own home, and who may be interested in utilizing such a device a single time, and who will thereafter want to be able to readily store it for possible future use.) Likely for many of these reasons, prior art devices as described herein have not achieved broad acceptance within the field.

A need exists for a toilet lifting and transport device that is relatively simple in terms of its construction and use, and that is collapsible for transport to or from a job and for storage. The present invention satisfies these needs and provides other related advantages.

SUMMARY OF THE INVENTION

In accordance with one embodiment of the present invention, a toilet lifting and transport device is disclosed. The device comprises, in combination: at least one horizontal support; a screw lift coupled to the at least one horizontal support; bridge straps coupled at a first end thereof to the screw lift; clasping elements coupled at a second end of the bridge straps; two rear legs substantially co-planar with the horizontal support; a wheel located on a bottom end of each of the two rear legs; a toilet tank strap located proximate the horizontal support and adapted to be positioned around a toilet tank; forward legs adapted to selectively occupy an open configuration at a substantially right angle to the horizontal support and a collapsed configuration substantially co-planar with the horizontal support; and a wheel located on a bottom end of each of the two forward legs.

In accordance with another embodiment of the present invention, a toilet lifting and transport device is disclosed. The device comprises, in combination: a first horizontal support; a second horizontal support located below the first horizontal support; a handle located above each of the first horizontal support; a screw lift coupled to each of the first and the second horizontal supports; bridge straps coupled at a first end thereof to the screw lift; clasping elements coupled at a second end of the bridge straps; two rear legs substantially co-planar with the horizontal support; a wheel located on a bottom end of each of the two rear legs; a toilet tank strap located proximate the horizontal support and adapted to be positioned around a toilet tank; forward legs adapted to selectively occupy an open configuration at a substantially right angle to the horizontal support and a collapsed configuration substantially co-planar with the horizontal support; and a wheel located on a bottom end of each of the two forward legs.

In accordance with a further embodiment of the present invention a method for lifting and transporting a toilet is disclosed. The method comprises the steps of: providing a toilet lifting and transport device comprising, in combination: at least one horizontal support; a screw lift coupled to the at least one horizontal support; bridge straps coupled at a first end thereof to the screw lift; clasping elements coupled at a second end of the bridge straps; two rear legs substantially co-planar with the horizontal support; a wheel located on a bottom end of each of the two rear legs; a toilet tank strap located proximate the horizontal support and adapted to be positioned around a toilet tank; forward legs adapted to selectively occupy an open configuration at a substantially right angle to the horizontal support and a collapsed configuration substantially co-planar with the horizontal support; and a wheel located on a bottom end of each of the two forward legs; providing a toilet fixture having a tank, a bowl, and a bridge between the tank and the bowl; placing the toilet lifting and transport device in the open configuration; positioning the toilet lifting and transport device over a toilet so that the bowl is located between the forward legs and so that the horizontal support is contacting the tank; coupling the clasping elements to the bridge; activating the screw lift in a direction that will cause the toilet fixture to be lifted; and transporting the toilet lifting and transport device, with the toilet fixture coupled thereto by causing the toilet lifting and transport device to roll on the wheels.

BRIEF DESCRIPTION OF THE DRAWINGS

FIG. 1 is a perspective view showing a device consistent with an embodiment of the present invention in position on a toilet, with the toilet on the ground.

FIG. 1A is a perspective view showing a device consistent with an embodiment of the present invention in position on a toilet, with the toilet in a lifted position.

FIG. 2 is a perspective view showing a device consistent with an embodiment of the present invention, configured for use.

FIG. 2A is a perspective view showing the device of FIG. 2 in a collapsed configuration.

DETAILED DESCRIPTION OF THE PREFERRED EMBODIMENTS

Figure 3:
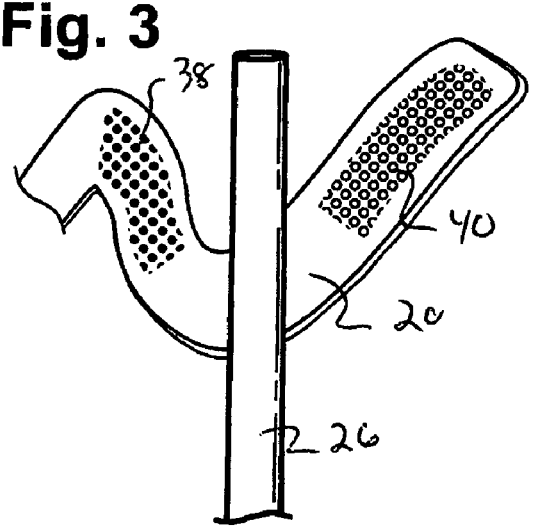
FIG. 3 is a front view of the end portion of a tank strap element of a device consistent with an embodiment of the present invention, showing opposing hook and loop covered surfaces.

Referring first to FIGS. 1–2A, the main elements of a toilet lifting and transport device (hereinafter "lifting device 10") consistent with the present invention are shown. Moving from the top of the lifting device 10 down, it can be seen that in this embodiment, the lifting device 10 features a handle 12, a first horizontal support 14, a second horizontal support 16, a screw lift 18, a tank strap 20, bridge straps 22, forward legs 24 and rear legs 26. These elements, and their functions, will now be described in additional detail.

The screw lift 18 is preferably attached to each of the first horizontal support 14 and the second horizontal support 16. The bridge straps 22 are attached at a first end thereof to the screw lift 18. They may be moved upward or downward, as desired, by turning of the screw lift handle 28. Turning in a first direction will cause upward movement of the bridge straps 22, while turning in an opposite second direction will cause downward movement of the bridge straps 22. Coupling hooks 30 are located on a second end of the bridge straps 22.

Preferably, the second horizontal support 16 has padding thereon, and preferably has two tank pads 32 as shown in FIGS. 1–2A. Because the second horizontal support 16 will contact the toilet tank 34 during use, the tank pads 32 can prevent scratching or marking of the toilet tank 34 during lifting and/or transport, and can also facilitate improved grasping of the toilet tank 34 during such operations.

Figure 3A:
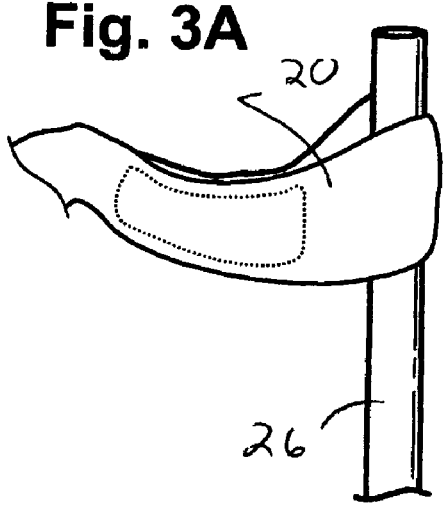
FIG. 3A is a front view of the end portion of the tank strap element of FIG. 3, in a coupled configuration.
Figure 4:
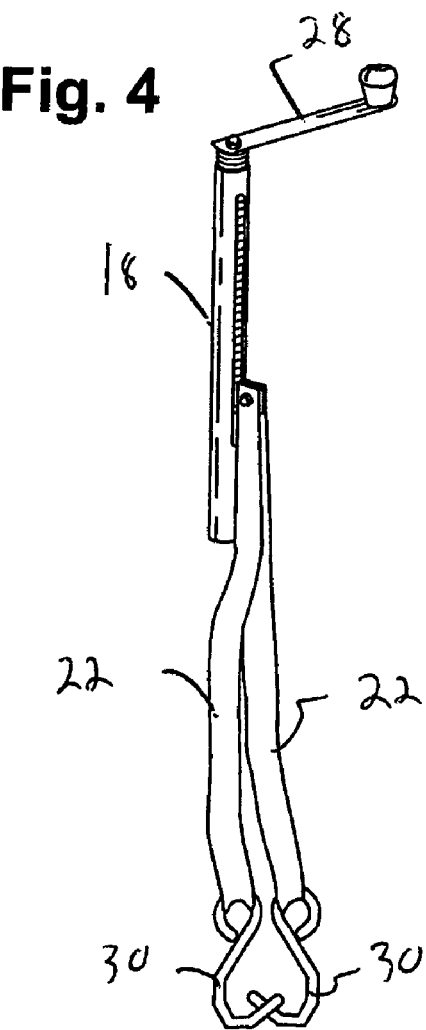
FIG. 4 is a front view of a screw lift element of a device consistent with an embodiment of the present invention.

Preferably, a tank strap 20 is provided. The tank strap 20 should be coupled at a first end thereof to a first side of the lifting device 10, and preferably to a one of the rear legs 26 at a point that is proximate the second horizontal support 16. Referring now to FIGS. 3–3A, it is preferred that the second end of the tank strap 20 should have opposing areas of hook material 38 and loop material 40. In this configuration, as shown in FIG. 3A, the second end of the tank strap 20 can be fastened around a side of the lifting device 10. Preferably, this is accomplished by fastening the second end of the tank strap 20 around a second side of the lifting device 10, and preferably about the other rear leg 26. (It should be noted that it may be desired to provide a tank strap 20 of sufficient length to permit its second end it to be fastened around the same rear leg 26 to which the first end of is coupled, or event to permit additional wrapping.)

The coupling hooks 30 located on a second end of the bridge straps 22 are adapted to be received in recessed areas that are typically found in an underside of the bridge 42 portion of a toilet fixture 50. The coupling hooks 30 are intended to represent one embodiment of a bridge clasping element for the second end of the bridge straps 22. Other embodiments may be possible. For example, it may be desired to provide opposing hook and loop material areas on the second ends of the two bridge straps 22, and to couple these areas below the bridge for lifting and transport of the toilet fixture 50.

Referring now to FIGS. 2–2A, open and collapsed configurations of the lifting device 10 are shown. In the open configuration, forward legs 24 are deployed at a substantially right angle to the handle 12, and first and second horizontal supports 14 and 16. In this configuration, as shown in FIGS. 1–1A, the lifting device may be positioned over a toilet fixture 50, with the bowl 52 portion of the toilet fixture 50 between the forward legs 24.

As shown in FIG. 2A, in a collapsed configuration, the forward legs 24 are in a folded or collapsed configuration. In this configuration, the forward legs 24 are substantially co-planar with the handle 12, first and second horizontal supports 14 and 16, and the rear legs 26. It should also be noted that the forward legs 24, in the open configuration, preferably project at a substantially right angle relative to the second horizontal support 16 in a forward direction, an extend initially in a downward direction at an acute angle. The forward legs 24 then, preferably, curve downward so that a lower portion thereof, in the open configuration, is substantially parallel to rear legs 26.

Preferably, through a spring loaded mechanism, the use of pins or screws, or otherwise, the forward legs 24 are permitted to lock into either an open configuration (e.g., FIG. 2) or a collapsed configuration (e.g., FIG. 2A). Particularly with regard to the open configuration, positively locking of the forward legs 24 can eliminate the risk of buckling or collapse of the lifting device 10 during use.

Each of the forward legs 24 and rear legs 26 should have a wheel 44 thereon. At least two and preferably all the wheels 44 should be freely rotatable relative to the leg to which they are coupled, so that rolling of the lifting device 10 with a toilet fixture 50 thereon can proceed in any desired direction—in other words, so that steering of the lifting device 10 is facilitated. It may further be desired to provide a braking element on one or more of the wheels 44, so that the lifting device 10 can be secured in position with a toilet fixture 50 thereon.

Preferably, the lifting device 10 has a slight forward lean, so that the weight of the toilet fixture 50 can be more evenly distributed among the four wheels 44.

It should be noted that the frame components of the lifting device 10 (including the handle 12, first and second horizontal supports 14 and 16, and forward and rear legs 24 and 26 are preferably formed of a high strength material, such as tubular steel.

STATEMENT OF OPERATION

In order to utilizing the lifting device 10 of the present invention, it is first necessary to position it in an open configuration, with the forward legs 24 at a substantially right angle to the second horizontal support 16. The lifting device 10 should then be positioned over a toilet fixture 50 until arriving at the position shown in FIG. 1, with the tank pads 32 contacting the tank 34 and the bowl 52 located between the forward legs 24. The tank strap 20 should be coupled around the tank 34, and fastened around the lifting device 10 in a relatively snug manner.

As shown in FIG. 1, the coupling hooks 30 should be attached to the underside of bridge 42. (The bridge and tank coupling steps can proceed in any desired order.) Once the tank 34 and bridge 42 are coupled to the lifting device 10, the screw lift handle 28 should be turned in the direction that will raise the toilet fixture 50 off of the ground. The user should then grasp the handle 12 (if provided) and roll the lifting device 10 in the desired direction, steering as necessary. When the desired destination is reached, the user should turn the screw lift handle 28 in the lowering direction, and lower the toilet fixture 50 until it is fully-lowered. At that point, the tank strap 20 and coupling hooks 30 may be detached from the toilet fixture 50, and the lifting device 10 removed therefrom.

To collapse the lifting device 10 for storage, the forward legs 24 are positioned, as shown in FIG. 2A, so that they are substantially co-planar with the second horizontal support 16.

While the invention has been particularly shown and described with reference to preferred embodiments thereof, it will be understood by those skilled in the art that the foregoing and other changes in form and details may be made therein without departing from the spirit and scope of the invention. For example, it may be possible to eliminate the first horizontal support 14, perhaps by providing a wider second horizontal support 16. It may also be possible to eliminate the handle 12, with movement of the lifting device 10 and toilet fixture 50 being accomplished by grasping the toilet fixture 50 or some other component of the lifting device 10.

I claim:

1. A toilet lifting and transport device comprising, in combination:
   at least one horizontal support;
   a screw lift coupled to said at least one horizontal support;
   bridge straps coupled at a first end thereof to said screw lift;
   clasping elements coupled at a second end of said bridge straps;
   two rear legs substantially co-planar with said horizontal support;
   a wheel located on a bottom end of each of said two rear legs;
   a toilet tank strap located proximate said horizontal support and adapted to be positioned around a toilet tank;
   forward legs adapted to selectively occupy an open configuration at a substantially right angle to said horizontal support and a collapsed configuration substantially co-planar with said horizontal support; and
   a wheel located on a bottom end of each of said two forward legs.

2. The toilet lifting and transport device of claim 1 further comprising a handle located above said horizontal support.

3. The toilet lifting and transport device of claim 1 wherein a first end of said tank strap is coupled to one of said rear legs at a point that is proximate said horizontal support.

4. The toilet lifting and transport device of claim 1 wherein a second end of said tank strap has a section of hook material and a section of loop material, positioned so that the tank strap can be fastened around one of said rear legs with said hook material clasping said loop material.

5. The toilet lifting and transport device of claim 1 further comprising a second horizontal support, and wherein said screw lift is attached to each of said at least one horizontal support and said second horizontal support.

6. The toilet lifting and transport device of claim 1 wherein at least two of said wheels are rotatable relative to one of said rear legs and said forward legs so as to permit steering of said toilet and lifting transport device.

7. The toilet lifting and transport device of claim 6 wherein all four wheels are rotatable to said legs to which they are coupled.

8. A toilet lifting and transport device comprising, in combination:
   a first horizontal support;
   a second horizontal support located below said first horizontal support;
   a handle located above each of said first horizontal support;
   a screw lift coupled to each of said first and said second horizontal supports;
   bridge straps coupled at a first end thereof to said screw lift;
   clasping elements coupled at a second end of said bridge straps;
   two rear legs substantially co-planar with said horizontal support;
   a wheel located on a bottom end of each of said two rear legs;
   a toilet tank strap located proximate said horizontal support and adapted to be positioned around a toilet tank;
   forward legs adapted to selectively occupy an open configuration at a substantially right angle to said horizontal support and a collapsed configuration substantially co-planar with said horizontal support; and
   a wheel located on a bottom end of each of said two forward legs.

9. The toilet lifting and transport device of claim 8 wherein a first end of said tank strap is coupled to one of said rear legs at a point that is proximate said horizontal support.

10. The toilet lifting and transport device of claim 8 wherein a second end of said tank strap has a section of hook material and a section of loop material, positioned so that the tank strap can be fastened around one of said rear legs with said hook material clasping said loop material.

11. The toilet lifting and transport device of claim 8 wherein at least two of said wheels are rotatable relative to one of said rear legs and said forward legs so as to permit steering of said toilet and lifting transport device.

12. The toilet lifting and transport device of claim 11 wherein all four wheels are rotatable to said legs to which they are coupled.

13. The toilet lifting and transport device of claim 8 further comprising at least one tank pad located on said second horizontal support.

14. A method for lifting and transporting a toilet comprising the steps of:
   providing a toilet lifting and transport device comprising, in combination:
      at least one horizontal support;
      a screw lift coupled to said at least one horizontal support;
      bridge straps coupled at a first end thereof to said screw lift;
      clasping elements coupled at a second end of said bridge straps;
      two rear legs substantially co-planar with said horizontal support;
      a wheel located on a bottom end of each of said two rear legs;
      a toilet tank strap located proximate said horizontal support and adapted to be positioned around a toilet tank;
      forward legs adapted to selectively occupy an open configuration at a substantially right angle to said horizontal support and a collapsed configuration substantially co-planar with said horizontal support; and
      a wheel located on a bottom end of each of said two forward legs;
   providing a toilet fixture having a tank, a bowl, and a bridge between said tank and said bowl;
   placing said toilet lifting and transport device in said open configuration;
   positioning said toilet lifting and transport device over a toilet so that said bowl is located between said forward legs and so that said horizontal support is contacting said tank;
   coupling said clasping elements to said bridge;
   activating said screw lift in a direction that will cause said toilet fixture to be lifted; and
   transporting said toilet lifting and transport device, with said toilet fixture coupled thereto by causing said toilet lifting and transport device to roll on said wheels.

15. The method of claim 14 wherein said step of providing a toilet lifting and transport device further comprises the step of providing a handle located above said horizontal support.

16. The method of claim 14 wherein a first end of said tank strap is coupled to one of said rear legs at a point that is proximate said horizontal support.

17. The method of claim 14 wherein a second end of said tank strap has a section of hook material and a section of loop material, positioned so that the tank strap can be fastened around one of said rear legs with said hook material clasping said loop material.

18. The method of claim 14 further comprising a second horizontal support, and wherein said screw lift is attached to each of said at least one horizontal support and said second horizontal support.

19. The method of claim 14 wherein at least two of said wheels are rotatable relative to one of said rear legs and said forward legs so as to permit steering of said toilet and lifting transport device.

20. The toilet lifting and transport device of claim 19 wherein all four wheels are rotatable to said legs to which they are coupled.

* * * * *